United States Patent [19]

Matsui

[11] Patent Number: 4,743,932
[45] Date of Patent: May 10, 1988

[54] FOCUS DETECTION DEVICE FOR A CAMERA

[75] Inventor: Toru Matsui, Sakai, Japan

[73] Assignee: Minolta Camera Kabushiki Kaisha, Osaka, Japan

[21] Appl. No.: 877,781

[22] Filed: Jun. 24, 1986

[30] Foreign Application Priority Data

Jun. 24, 1985 [JP] Japan .................................. 60-138454
Jun. 24, 1985 [JP] Japan .................................. 60-138455
Jun. 24, 1985 [JP] Japan .................................. 60-138456

[51] Int. Cl.⁴ ............................................. G03B 3/00
[52] U.S. Cl. ..................................... 354/403; 359/407
[58] Field of Search ................ 354/402, 403, 407, 408

[56] References Cited

U.S. PATENT DOCUMENTS

| | | | |
|---|---|---|---|
| 4,357,085 | 11/1982 | Niwa et al. ........................... | 354/403 |
| 4,511,232 | 4/1985 | Yamada ............................... | 354/403 |
| 4,549,802 | 10/1985 | Ohtaka ................................ | 354/403 |
| 4,561,748 | 12/1985 | Omaki et al. ........................ | 354/403 |
| 4,571,047 | 2/1986 | Hirai ................................... | 354/403 |
| 4,618,235 | 10/1986 | Ishida et al. ......................... | 354/403 |
| 4,632,532 | 12/1986 | Matsumura et al. ................. | 354/403 |
| 4,690,538 | 9/1987 | Matsui et al. . | |

FOREIGN PATENT DOCUMENTS

| | | |
|---|---|---|
| 22210 | 2/1982 | Japan . |
| 59-1203 | 1/1984 | Japan . |
| 183325 | 10/1984 | Japan . |
| 60-32013 | 2/1985 | Japan . |

*Primary Examiner*—Russell E. Adams
*Attorney, Agent, or Firm*—Burns, Doane, Swecker & Mathis

[57] ABSTRACT

A focus detection system for a camera, especially for a single lens reflex camera, is disclosed.

The focus detection system comprises a light projection means for illuminating an object at the active AF and means for switching positions and/or sizes of iris apertures for focus detection according to the type, F-number, focal length, shift amount etc., of an interchangeable lens assembly in order to remove possible light beams such as flares and ghosts generated by surface reflections due to lenses comprising the interchangeable objective lens.

16 Claims, 18 Drawing Sheets

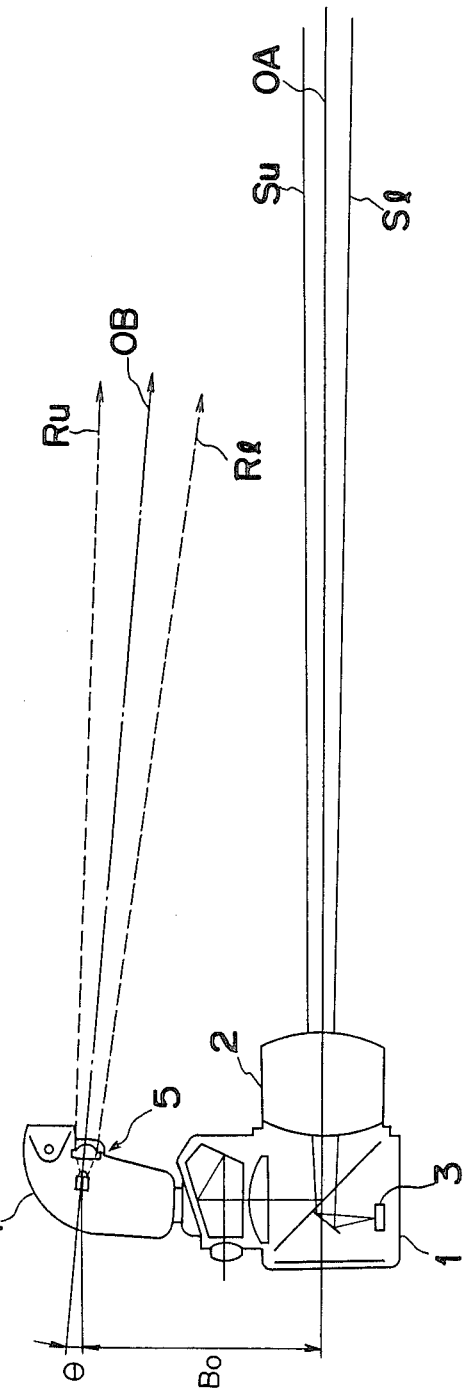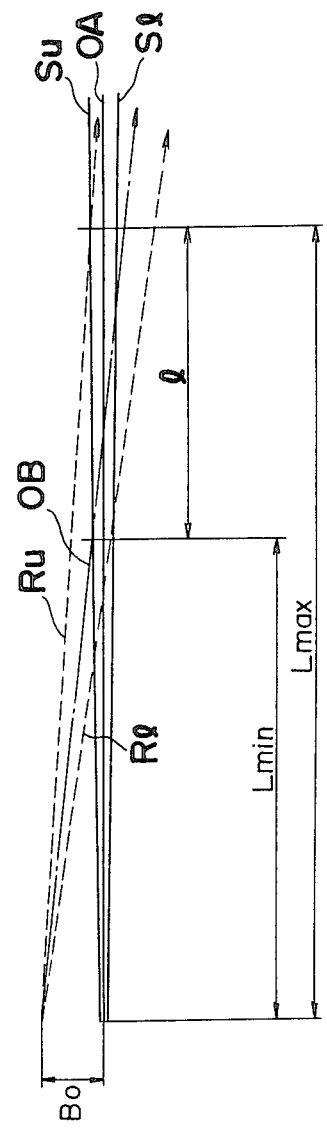
Fig.1
(a)
Fig.1
(b)

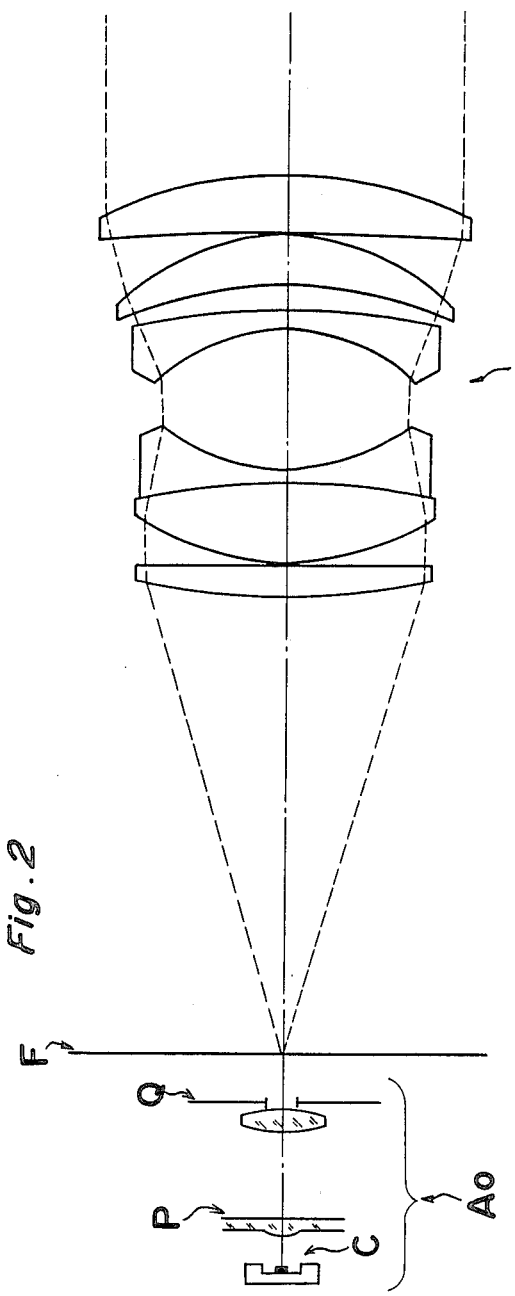
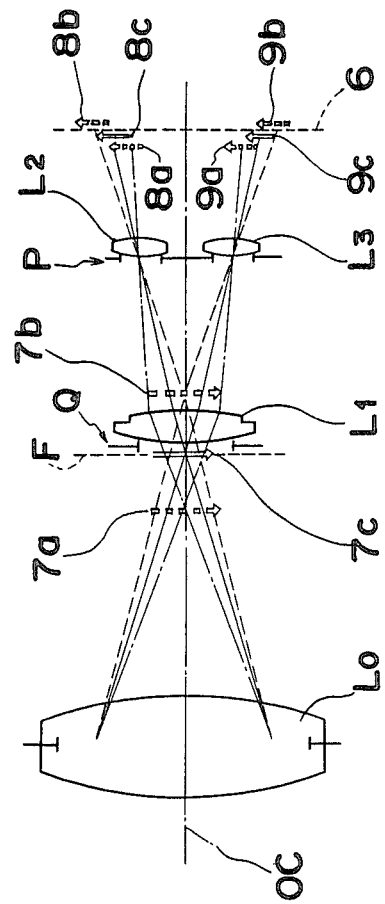

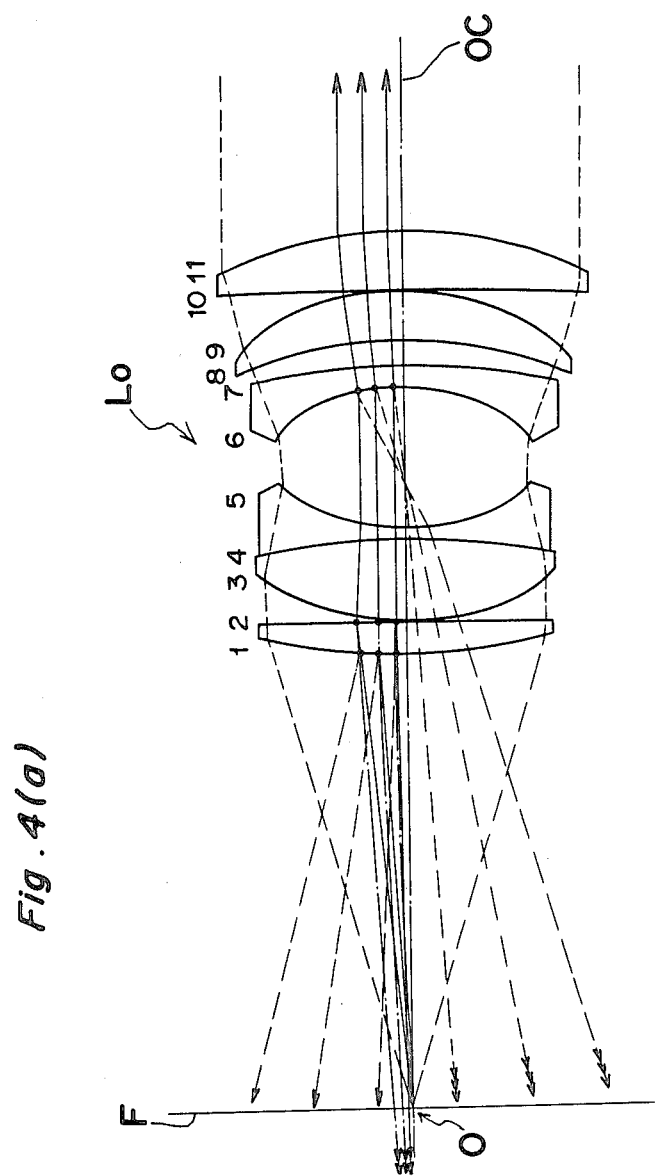

Fig. 5(a)
Fig. 5(b)
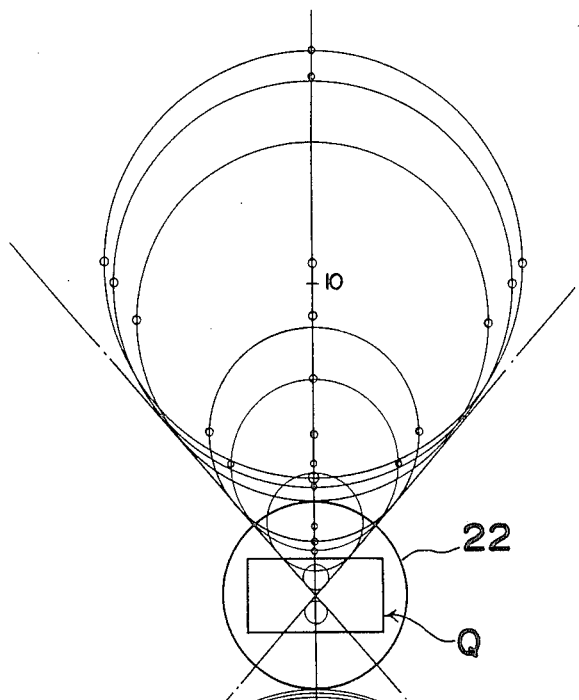
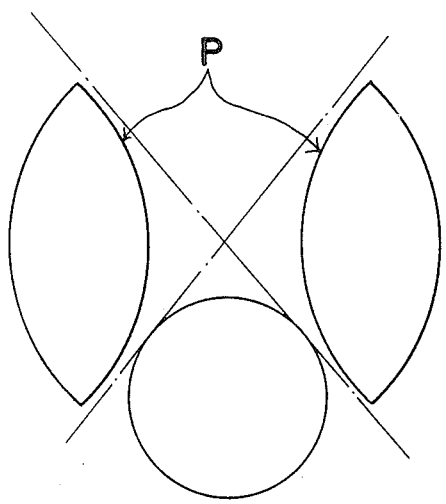

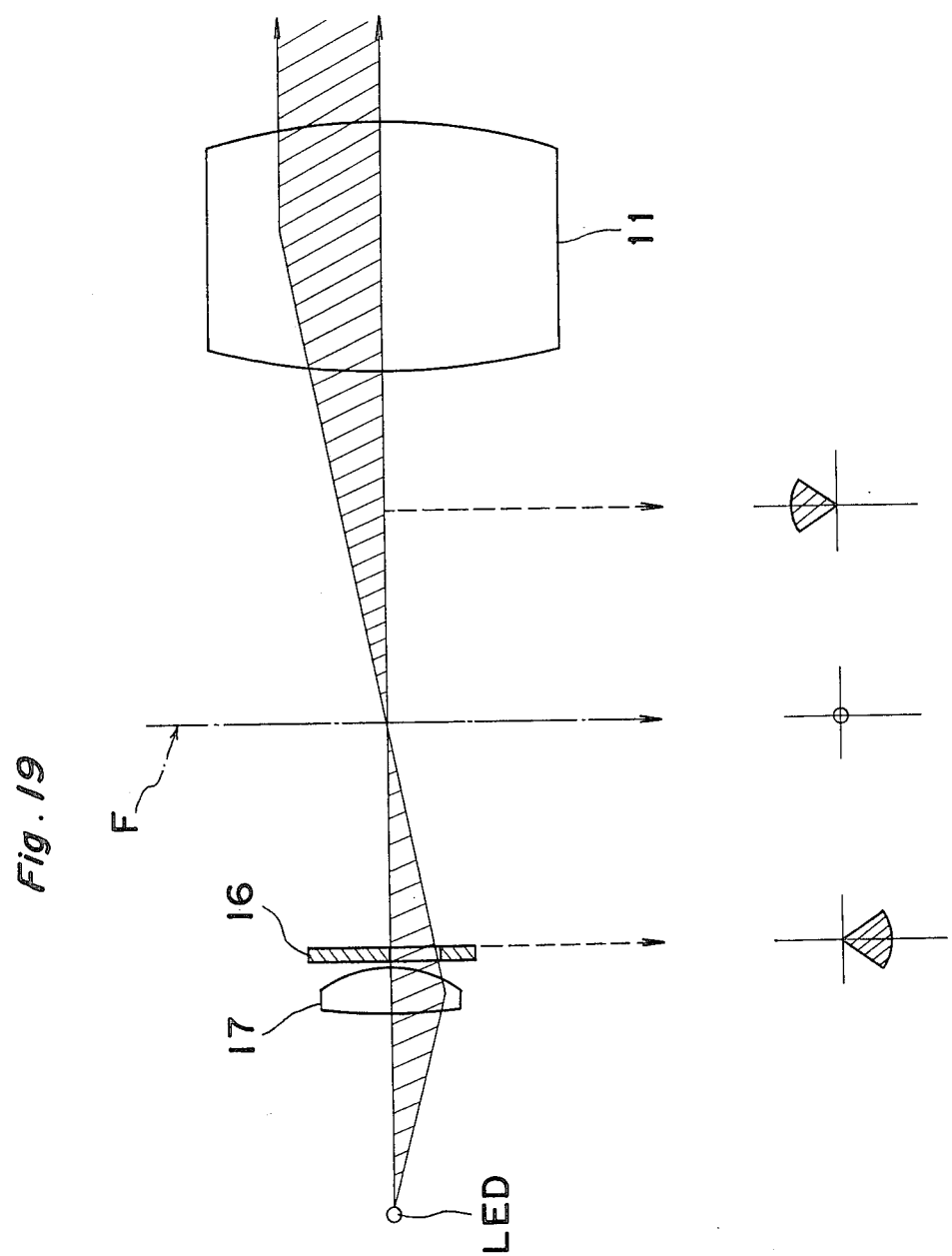

FOCUS DETECTION DEVICE FOR A CAMERA

BACKGROUND OF THE INVENTION

1. Field of the Invention

The present invention relates to a focus detection device for a camera comprising a light projection means for projecting light beams onto an object through an objective lens mounted on the camera, a light receiving means for receiving light beams reflected by the object through the objective lens and a focus detection means for detecting the condition of focusing from outputs of said light receiving means.

2. Description of the Prior Art

Generally speaking, one of the important factors required of a focus detection device for a single lens reflex camera is an applicability for a variety of interchangeable objective lens each having an individual F-number and an individual focal length. It is also an important factor that the focus detection can be carried out irrespective of the brightness of an ambient light and/or an object.

There is proposed a focus detection system in which an auxiliary illuminating means is installed in an electronic flash device to be mounted on the camera for projecting light beams to an object when the circumference is too dark into detecting the focusing (See U.S. Ser. No. 807,642).

FIG. 1(a) shows a conventional focus detection system schematically.

As shown in FIG. 1(a), a focus detection module 3 is provided in a camera body 1 with an objective lens 2 for receiving an image of an object through the objective lens to detect the focusing condition of the objective lens automatically. As indicated by two lines Su and Sl in FIG. 1(a), the area in which the focusing can be detected by the focus detection module is limited to an area defined between two lines Su and Sl being symmetric to each other with respect to the optical axis of the objective lens.

In an electronic flash device 4 being mounted on the camera body 1, there is provided an auxiliary illuminating means 5. The auxiliary illuminating means 5 projects illuminating light beams onto an object to which the focusing condition is detected, and the focusing condition is detected by receiving light beams reflected from the object when the circumference is dark. The auxiliary illuminating means 5 is arranged to have a distance of Bo to the optical axis OA of the objective lens and the optical axis thereof is so inclined as to make an angle of $\theta$ with the optical axis OA of the latter. Further, the width of light beams emitted therefrom is so restricted as to have a width as is defined between two dotted lines Ru and Rl.

In such a focus detection system as mentioned above, a range being illuminated by the light of said auxiliary illuminating means is limited to a range indicated by l in FIG. 1(b) defined between Lmin and Lmax, since the optical axis OB of the auxiliary illuminating means is inclined to the optical axis OA of the objective lens. Although it is not impossible to elongate the range l by widening the projection angle of the illuminating light beams, this invites insufficiency in the amount of the illuminating light. Further, this system has a disadvantage in that it is not available if one does not bring the electronic flash device.

In JP-A No. 155832/1979, there is proposed another focus detection system in which an illuminating means is installed within the camera body which projects illuminating light beams onto an object through a predetermined area of the objective lens. The light reflected from the object is received, through another restricted area of the objective lens, by a light receiving device installed in the camera body to detect the focusing condition. Although this system can elliminate such disadvantages mentioned above, it invites other problems such that the projected light beams are reflected by surfaces of lenses comprising the objective lens to cause ghost images and/or flares which negatively influence the focus detection.

Contrary to the above, in JP-A No. 22210/1982, there is proposed an optical system for focus detection in which an optical axis for projecting light beams through a predetermined area of the objective lens and an optical axis for receiving the reflected light through another area thereof are set so as not to be symmetric to the principle plane of the objective lens with respect to a crossing point on the optical axis of the objective lens with said principle plane. According to this optical system, such problems as mentioned above are eliminated. Also, due to said optical arrangement in regard to the optical axes for projection and for receiving, ghost images and flares are removed, as far as the focus detection is concerned.

Since there is such a relation that ghosts and flares due to reflections between or among surfaces of the lens are generated symmetrically with respect to the optical axis of the objective lens, it is better to avoid said relations in order to remove bad influences due to ghosts and flares. One of the important points to be considered when said optical system is to be applied to a single lens reflex camera with a variety of interchangeable lens is that the range in which ghosts and flares are generated symmetrically with respect to a point on the optical axis of varied according to the construction of the objective lens, the driving amount of the objective lens for focusing and so on. This depends on differences among optical constructions of objective lenses. Since there is a restriction with respect to the focus detectable distance, as mentioned above, in a so-called active focus detecting system (hereinafter referred to as the active AF) in which light beams are projected onto an object from the camera and the reflected light is received to detect the focusing condition, said system is not available to an interchangeable objective lens having a relatively long focal length. Therefore, it is better to use a so-called passive auto-focus detecting system (hereinafter referred to as the passive AF) which detects the focusing condition with use of ambient light and which has no restriction with respect to the focus detectable distance together with the active AF.

In any system of the active or passive AF, it is necessary that the system can be adapted to any of a variety of interchangeable objective lenses having different F-numbers and focal lengths respectively. In order to achieve this result, the optical axis for receiving reflected light should be set close to the optical axis of the objective lens. However, such an arrangement is apt to be affected by ghosts and flares upon using the active AF.

SUMMARY OF THE INVENTION

One essential object of the present invention is to provide a focus detection device with a high precision for a camera which is able to avoid bad effects due to ghosts and flares caused by inbetween surface reflections in the objective lens when the active AF is chosen.

Another object of the present invention is to provide a focus detection device for a camera which is available to every interchangeable objective lens having an individual focal length and an individual F-number and is capable of adapting to an individual minimum F-number and driving amount of the objective lens and to zooming condition of a zoom lens system at the time of active AF.

In order to attain these objects of the present invention, there is provided a camera with an objective lens means comprising an image forming means for forming two images by refocusing an image on a predetermined focal plane of the objective lens which is arranged behind said focal plane, a light bundle restricting means for splitting a light bundle having been passed through the objective lens into two which is arranged near the refocusing means nd provides a pair of apertures being arranged at positions being substantially symmetrical with respect to the optical axis of the objective lens, a light receiving means for receiving two images having been formed by said image forming means, a focus detecting means for detecting whether an objective image is focused on a focal plane according to outputs of said light receiving means, and a light projecting means for projecting light beams against an object at an angle inclined to the optical axis on a plane including said optical axis and being substantially, perpendicular to a center line connecting centers of said two apertures of the light bundle restricting means.

According to a preferred embodiment of the present invention, said light bundle restriction means includes a detection means for deciding whether the objective lens mounted on the camera generates light images harmful to the focus detection or not. Said light bundle restriction means can be a position switching means for switching positions of the pair of apertures according to whether the objective lens which generates harmful light rays for focus detection is attached to the camera or not.

According to another embodiment of the present invention, said light bundle restriction means can be a size switching means for switching sizes of said pair of apertures according to an output of said detection means.

Further, the light bundle restriction means can be both of position and size switching means.

The present invention is completed on the bases of considerations as stated hereinafter.

FIG. 2 shows an optical system for focus detection.

As shown in FIG. 2, an optical focus detection device Ao is arranged behind the focal plane F of an objective lens Lo. Said focus detection device Ao includes two masks Q and P being arranged before lens means and a light receiving device C being comprised of an array of cells such as a charge-coupled device (hereinafter referred to as CCD).

FIG. 3 shows a schematical side elevational view of the focus detection system shown in FIG. 2.

As is well known to those skilled in the art, the focusing condition of the objective lens can be detected by detecting correlation between two images which are formed by two light bundles having been passed through first and second portions of the objective lens being provided opposite to each other so as to interpose the optical axis of the objective lens therebetween.

In order for that to occur, as shown in FIG. 3, a condenser lens $L_1$ is arranged together with the mask Q near to a position being equivalent to the focal plane F of the objective lens Lo and two focusing lenses $L_2$ and $L_3$ are respectively arranged to two apertures of the mask P being arranged behind the condenser lens $L_1$. On the focal plane 6 common to two focusing lenses $L_2$ and $L_3$, there are arranged a pair of line sensors being comprised of CCD cells respectively.

When the image of an object is focused forward of the focal plane F, as indicated by 7a in FIG. 3, two images 8a and 9a are focused on said line sensors so as to approach each other while interposing the optical axis. Contrary to the above, when the image of an object is focused behind the focal plane F, as indicated by 7b in FIG. 3, two images 8b and 9b are refocused on said line sensors so as to be remote from each other with respect to the optical axis.

If the image of an object is focused exactly on the focal plane F, as indicated by 7c, the distance between two points of two refocused images 8c and 9c corresponding to each other becomes a predetermined distance proper to the optical construction of the focus detection system employed. Accordingly, it becomes possible to detect the focusing condition of the objective lens by calculating the correlation between two light distribution patterns on the line sensors according to electric output signals therefrom.

FIGS. 4(a) and (b) are views showing how flares and/or ghosts are generated in the optical system for the active AF.

As shown in FIGS. 4(a) and (b), light rays are projected from the cross point O of the optical axis OC of the objective lens Lo with the focal plane F thereof at an angle slightly inclined to said optical axis. A part of the projected light beams is reflected by each surface of respective lens forming the lens assembly and is returned to the focal plane F.

FIG. 4(a) shows the light beams reflected one time by first, second and sixth surfaces (#1, #2 and #6) of the objective lens Lo. Also, FIG. 4(b) shows the light beams reflected three times by sixth, first and again sixth surfaces (#→#1→#6) thereof.

FIG. 5(a) shows flare images formed on the principal plane of the first mask Q. As is clearly shown in FIG. 5(a), flare images are formed symmetrically with respect to the optical axis, each of which is shown as a circle. Although only flare images generated by one time reflection are shown in FIG. 5(a), flare images generated by three times or more reflections are essentially similar to those of one time reflection.

FIG. 5(b) shows flare images formed on the principal plane of the second mask P. Since only light rays having been passed through the first mask Q are projected on the second mask P, flare light rays are reduced considerably.

FIG. 6 shows the manner in which flare images are changed according to individual objective lens. Flare images shown in FIG. 6 are those formed on the second mask P.

Each upper box of FIG. 6 shows flare images formed when the objective lens is shifted to the infinite focusing condition and each lower box shows those formed when the objective lens is at the nearest focusing condition thereof.

As is apparent from FIG. 6, the pattern of flare images due to the standard focal length objective lens system of 50/1.7 ($f/F_{NO}$) is different from the pattern of those due to the zoom lens system of 35-105/3.5-4.5. Even in the zoom lens system, flare images are varied considerably due to the zooming condition. In the case (L) that the longest focal length condition (105 mm) is chosen, flarge light rays are cut off by the second mask P. However, in the case (S) that the shortest focal length condition (35 mm) is chosen, there exist flare light rays which pass through the mask P. Further, the pattern thereof is varied delicately due to the shift of the objective lens. As is apparent from the above, if the mask is arranged near to the optical axis of the objective lens, flare images are greatly affected by zooming and/or shifting of the objective lens.

BRIEF DESCRIPTION OF THE DRAWINGS

These and other objects and features of the present invention will become apparent from the following description taken in conjunction with preferred embodiments thereof with reference to the accompanying drawings, wherein like parts are designated by like reference numerals, and in which:

FIG. 1(a) is a schematical sectional view of a camera having a conventional focus detection system, FIG. 1(b) is a schematical side view for showing a focus detectable range according to the focus detection system shown in FIG. 1(a), FIG. 2 is a schematical sectional view for showing a focus detection system for passive AF, FIG. 3 is a schematical plan view for showing the principle of focus detection, FIG. 4 (a) is a schematical sectional view for showing flares and ghosts caused by reflections on surfaces of lenses comprising an objective lens.

FIG. 19 is an explanative view showing a desirable light projection system according to the present invention.

DESCRIPTION OF THE PREFERRED EMBODIMENTS

Figure 7:
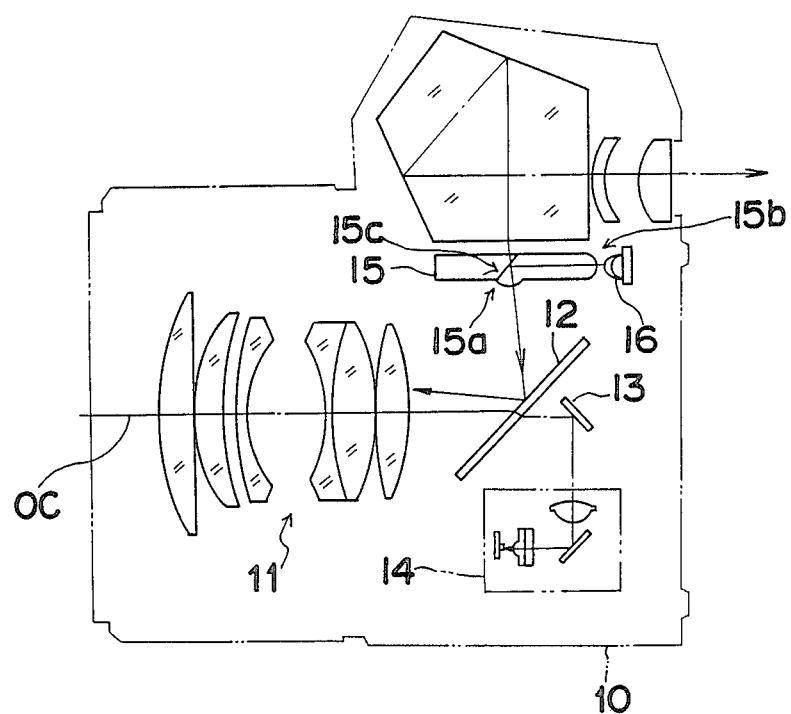
FIG. 7 is a schematical sectional view of a single lens reflex camera having an optical system for focus detection according to an embodiment of the present invention.

FIG. 7 shows a single lens reflex camera with a focus detection system according to the present invention.

In FIG. 7, the reference numeral 10 indicates the camera body, the reference numeral 11 indicates an interchangeable objective lens and the reference numeral 12 indicates a reflex mirror which reflects light rays having passed through the objective lens 11 toward the finder system housed in the camera body 10 and through the portion of which a part of the reflected light rays is introduced to the optical assembly 14 for focus detection. A small mirror 13 is provided behind the reflex mirror 12 for introducing the light rays having been passed through said portion of the reflex mirror 12.

An optical member 15 is provided under a pentagonal roof prism parallel to the bottom plane of said prism. The optical member 15 constitutes a convex lens with a convex portion 15a projected downwrd, a convex portion 15b projected so as to oppose LED 16 arranged beneath the prism, and a half mirror 15c provided at a portion where both of center lines of the two convex portions 15a and 15b cross with each other. Said half mirror 15c operates such an optical filter as to reflect light rays emitted from LED 16 and to pass the visible light. The angle of the half mirror 15c is so set as to reflect the light emitted from LED 16 in such a manner that the light rays after having been reflected by the reflex mirror 12 may be inclined at a small angle against the optical axis OC and, therefore, the light rays from LED 16 are projected to the exterior passing through a portion of the objective lens excepting for the optical axis OC.

Figure 8:
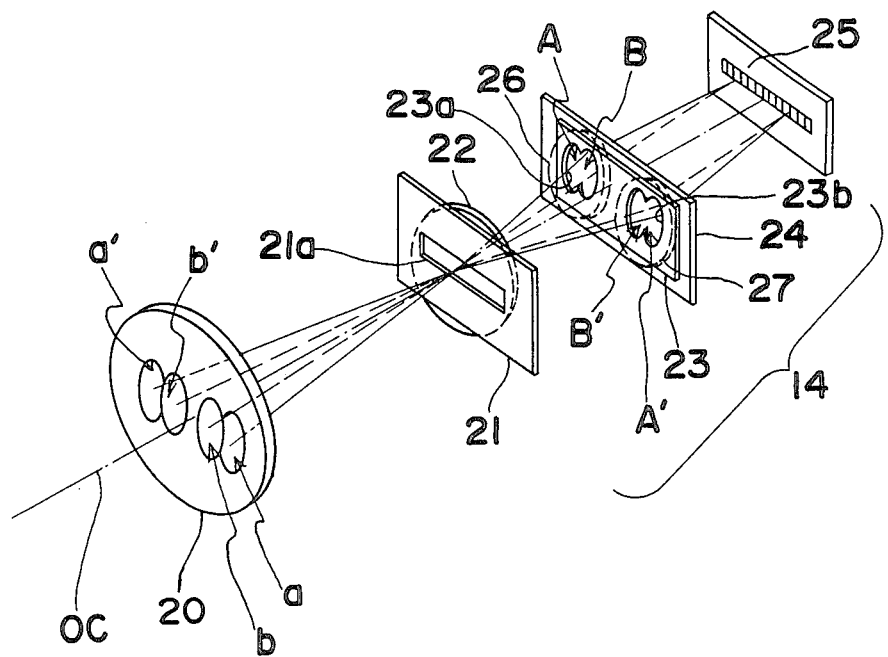
FIG. 8 is a schematical perspective view showing the optical system for focus detection according to the embodiment of the present invention.

FIG. 8 shows an example of the composition of the optical system for focus detection according to the present invention.

In FIG. 8, the objective lens is indicated by number 20 and a mask 21 having one slit-like aperture 21a is arranged on a plane being near to and parallel to the focal plane of the objective lens. On the rear surface of the mask 21, there is arranged a condenser lens 22. Rearward of the mask 21, there is arranged an iris plate 23 having two iris apertures 23a and 23b disposed to have a predetermined distance therebetween in the lengthwise direction of the iris plate. Each iris aperture is formed to have a shape such that two small ovals are partially overlapped keeping a parallel relation between long axes thereof.

On the rear surface of the iris plate 23, an electrochromic device 24 is attached. Further, two secondary focusing lenses 26 and 27 are arranged on just the rear side of the electrochromic device 24 so as to correspond to the iris apertures 23a and 23b respectively.

These two secondary focusing lenses 26 and 27 are provided for focusing two light bundles on a light receiving device 25 comprises of a dimensional array of CCD cells which have been passed through the two areas of the objective lens respectively, each defined by a pair of two ovals (a, b) or (a', b'), and through two iris apertures 23a and 23b of the iris plate 23.

Figure 9:
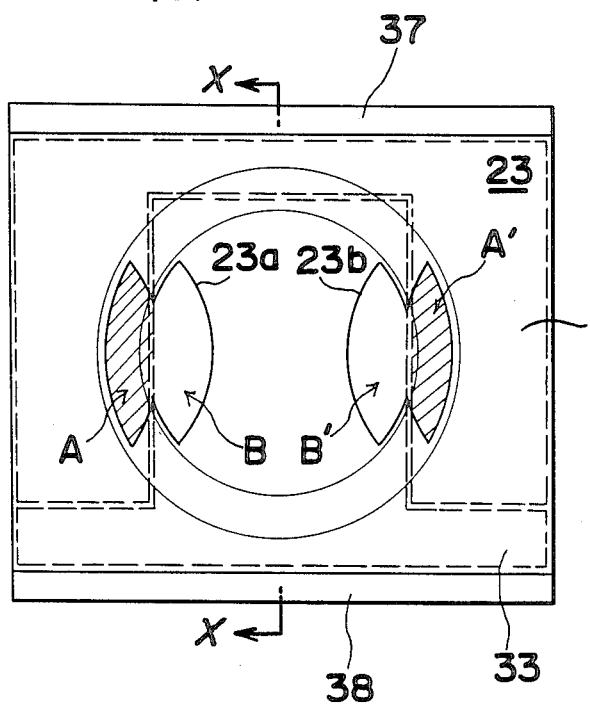
FIG. 9(a) is a front view of an electrochromic device provided as an iris plate in said optical system.
FIG. 9(b) is a sectional view of the electrochromic device sectioned along the line X—X in FIG. 9(a)
Figure 9:
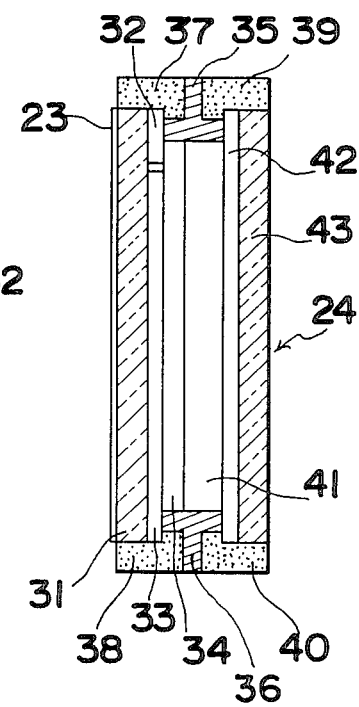

FIGS. 9(a) and (b) show a front view and a sectional view of a unit being comprised of the electrochromic device 24 and the iris plate 23 having two iris apertures 23a and 23b which is attached to the front surface of the former.

As shown in these figures, the electrochromic device 24 comprises a transparent glass plate 31 on the outer surface of which the iris plate 23 is adhered to. On the inner surface of the glass plate 31, there are formed first and second segment electrodes 32 and 33 made of a transparent electro-conductive material so as to divide the surface of the glass plate into two areas as indicated by dotted lines in FIG. 9(a). Of course, said first and second segment electrodes 32 and 33 are insulated from each other along the partition line therebetween. Said first segment electrode 32 is formed of a "inverted U" shape so as to cover both of outer ovals A, A' (hatched area in FIG. 9(a)) of the iris apertures 23a and 23b. On the other hand, the second segment 33 is formed of a "inverted T" shape so as to cover both of inner ovals B, B' of the iris apertures 23a and 23b.

Between the glass plate 31 and a transparent glass plate 43 on the inner surface of which a common transparent electrode 42 is formed by coating, there are interposed an electrochromic layer 34 made of tungsten oxide or iridium hydroxide and so on and an electrolytic layer 41. The peripheries of these two layers 34 and 41 are sealed by common seal members 35 and 36.

As is well known to those skilled in the art, if the electrochromic layer 34 is made of tungsten oxide, it is colored when a proper negative voltage is applied to the electrode contacting thereto. If it is made of iridium hydroxide, it is colored when a proper positive voltage is applied to the electrode contacting thereto.

Further, along the upper and lower edges of the glass plate 34, there are provided first and second electrodes 37 and 38 contacting electrically to said first and second segment electrodes 32 and 33 respectively. Also, along the upper and lower edges of the second glass plate 43, there are provided upper and lower electrodes 39 and 40 contacting electrically to the common electrode 42.

Therefore, in the case when the electrochromic layer 34 is made of tungsten oxide, two outer ovals A and A' of the iris apertures 23a and 23b are made colored since the area covered by the first segment electrode 32 is colored when a negative voltage is applied to the first segment electrode 37 to give an electric current between said first segment electrode 37 and the common electrode 39. Also, when a negative voltage is applied to the second segment electrode 38 to give an electric current between said second segment electrode 38 and the common electrode 40, the area covered by the second segment electrode 33 is made colored to make the inner ovals B and B' of the iris apertures 23a and 23b colored.

Figure 10:
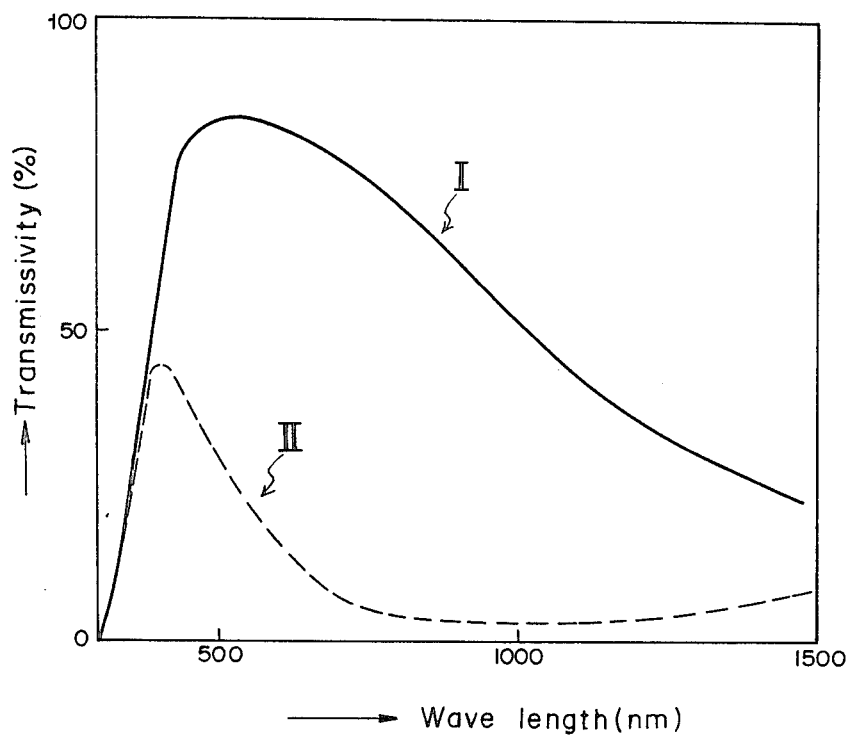
FIG. 10 is a graph showing the spectral transmissivity of an electrochomic device, FIGS. 11(a) and (b) are explanative sectional views of light emitting devices.

FIG. 10 is a graph showing spectral transmissive characteristics of an electrochromic material. Curve (I) shows a characteristic when the electrochromic material is not colored. Curve (II) shows a characteristic when the electrochromic material is colored. When colored, absorption of light is enhanced in a near infrared zone in comparison with the visible light.

Accordingly, if the wavelength of the projection light by LED is selected in the near infrared zone having the wavelength equal to or more than 700 nm, the electrochromic material can serve as a shutter means for cutting off the light rays. When areas of the outer ovals A and A' are colored, the projecting light can be passed only through areas of the inner ovals B and B'. Therefore, the angle of view of the projecting light rays is narrowed to an area near to the optical axis of the objective lens. Contrary to the above, when areas of the inner ovals B and B' are colored, peripheral portions remote from the optical axis are viewed by the optical system for focus detection.

As is clear from the above, it may be understood that bad influences due to flare lights and/or ghost images caused by reflections between or among surfaces of lenses of the objective lens system are removed by switching areas, through which the projecting light rays pass, in such a manner as mentioned above, when the active AF mode is selected.

In the case that such an interchangeable lens as of 50/1.7 (f/F$_{NO}$) or of 35-105/3.5-4.5 (L) (f/F$_{NO}$) at the longest focal length condition is mounted to the camera, areas B and B' of two inner ovals of the iris apertures 23a and 23b are used to detect the focusing since flares and/or ghosts are not so spread in the radial direction.

Contrary to the above, when the interchangeable lens of 35-105/3.5-4.5 is used at the shortest focal length thereof, the focus detection is carried out by the light rays having passed through the areas A and A' of the outer ovals of the iris apertures since flares and/or ghosts are spread widely.

Although it may be possible to use light beams passing through the outer areas A and A' always in the active AF mode for the focus detection, it is desirable to employ the switching method as mentioned above in order to increase the number of interchangeable lens systems to which the focus detection system of the embodiment of the present invention is applicable thereto. In other words, the focus detection system is applicable even to an interchangeable lens system having a relatively large F-number.

Since bad effects due to flares and/or ghosts are not caused at the passive AF, it is desirable to detect the focusing condition by using light beams passing through the areas B and B' in order to apply the focus detection system to an interchangeable lens system of a larger F-number.

However, in the case of a special interchangeable lens, for example a reflective telephoto lens system, in which the light can not pass through the central portion thereof because the iris aperture is formed ring like, although it has a large F-number, it is rather desirable to use the outer areas A and A' for focus detection even at the passive AF.

Figure 4B:
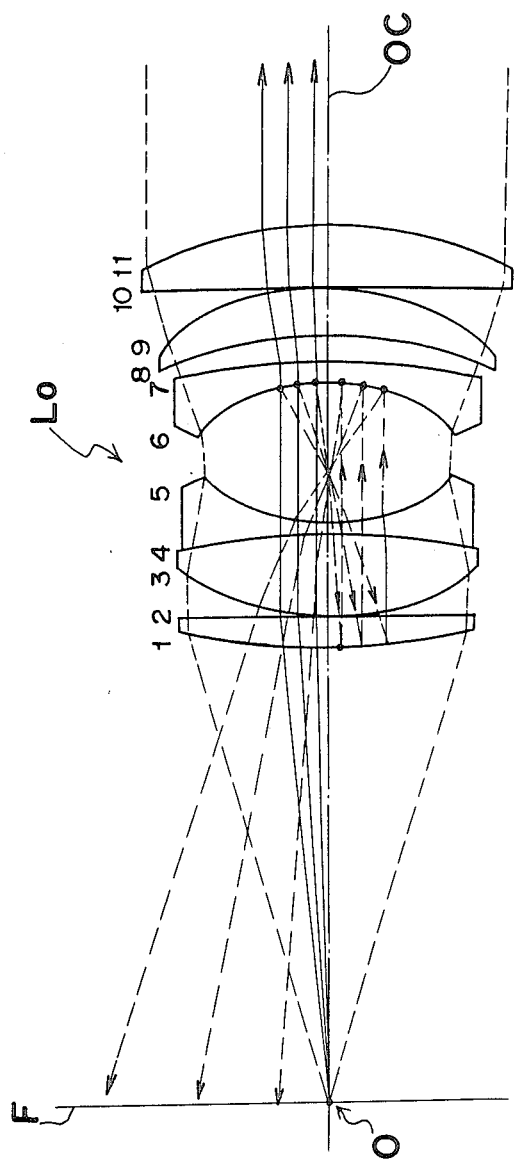
FIG. 4(b) is a schematical sectional view for showing flares and ghosts caused by multiple surface reflections in an objective lens, FIGS. 5(a) and (b) are enlarged front views for showing flares and ghosts formed on first and second mask plates respectively.
Figure 6:
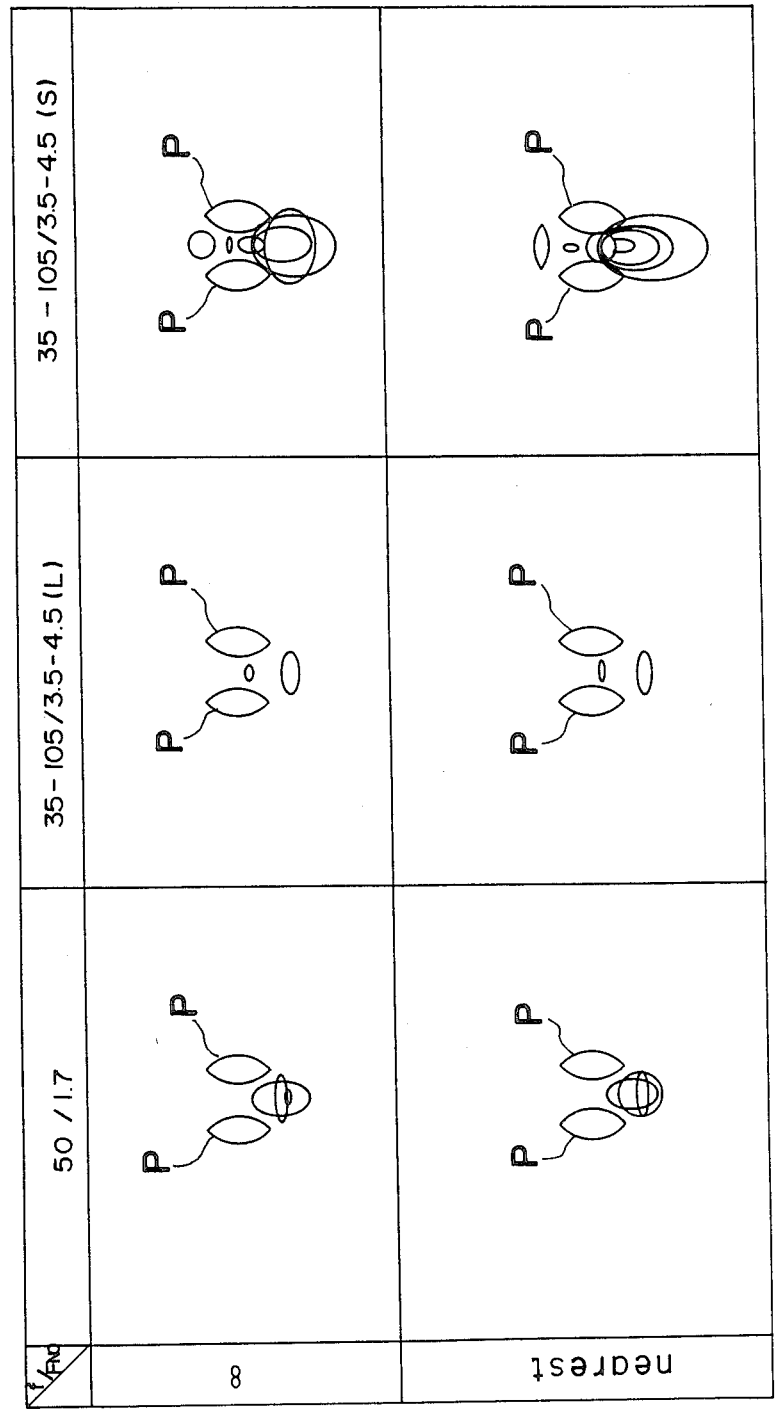
FIG. 6 shows a variety of patterns of flares and ghosts caused by objective lenses of many types.

As mentioned in respect to FIG. 6, since flares and/or ghosts are varied due to not only the type of interchangeable lens but also the shift amount thereof, it is best to take these factors into consideration upon determining modes for switching areas.

FIG. 8 shows ways how light paths of light beams for focus detection are varied when iris areas are switched from A, A' to B, B' or vice versa.

Although the electrochromic device is employed as means for switching areas of the iris apertures in the present embodiment, shutter means such as a liquid crystal device, electric photo cell, and further, a suitable mechanicl shutter means can be applied to the focus detection system according to the present invention.

Figure 11A:
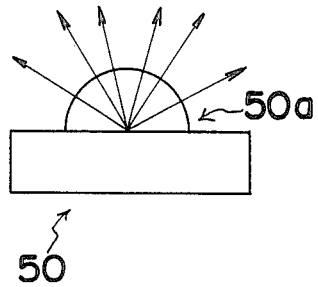
Figure 11B:
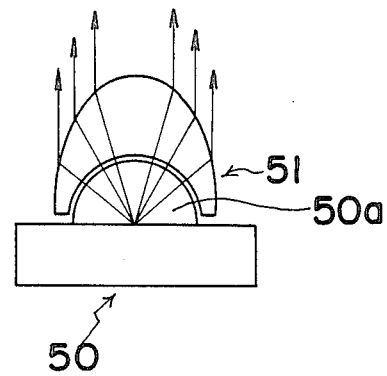

FIGS. 11(a) and (b) show examples of LED for projecting illuminating light beams.

LED 50 shown in FIG. 11(a) has a light emitting portion 50a of a half-spherical configuration. If the light source exists at the center point of the light emitting portion 50a, the light emitted from said center point is spread in all radial directions as shown in FIG. 11(a).

One of the important things with respect to the active AF optical system is to condense the light beams as narrow as possible. This is important, not only for extending the focus detectable distance range but also for avoiding band effects due to flares and/or ghosts. Further, it is important to collect light beams emitted from LED effectively in order to project light beams to an object.

In order to satisfy these requirements, it is desirable to attach a collimate lens 51 of a substantially oval configuration in front of LED 50 so as to cover the surface of the half spherical portion 50a therewith. If the light source is positioned at the center point of said oval 51, all light beams emitted from the light source are collimated. Accordingly, light rays emitted are collected effectively.

Figure 12:
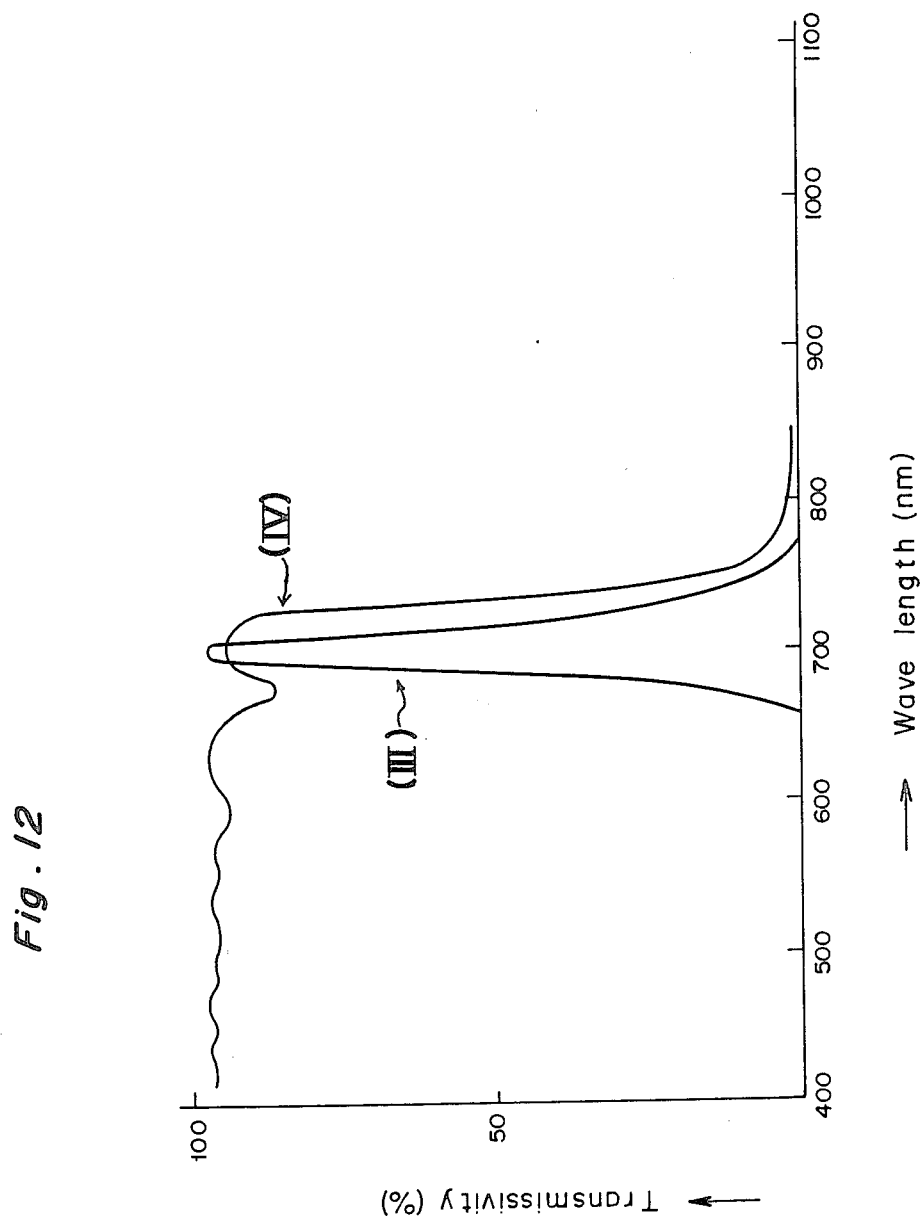
FIG. 12 is a graph showing a relation between the wavelength of projection light by LED and the spectral transmissivity of an infrared cut filter.

FIG. 12 shows a spectrum (IV) of the light emitted by the LED together with the spectral characteristic (III) of an optical filter for locking infrared light. This filter is arranged on the light path of the optical system for focus detection in order to remove a possible shift of the focal position due to the color aberration of the objective lens. This is also the reason why the wavelength of the light of the LED is set at 700 nm. Namely, this avoids a possible shift of the focal position due to the aberration in the active AF.

Figure 13:
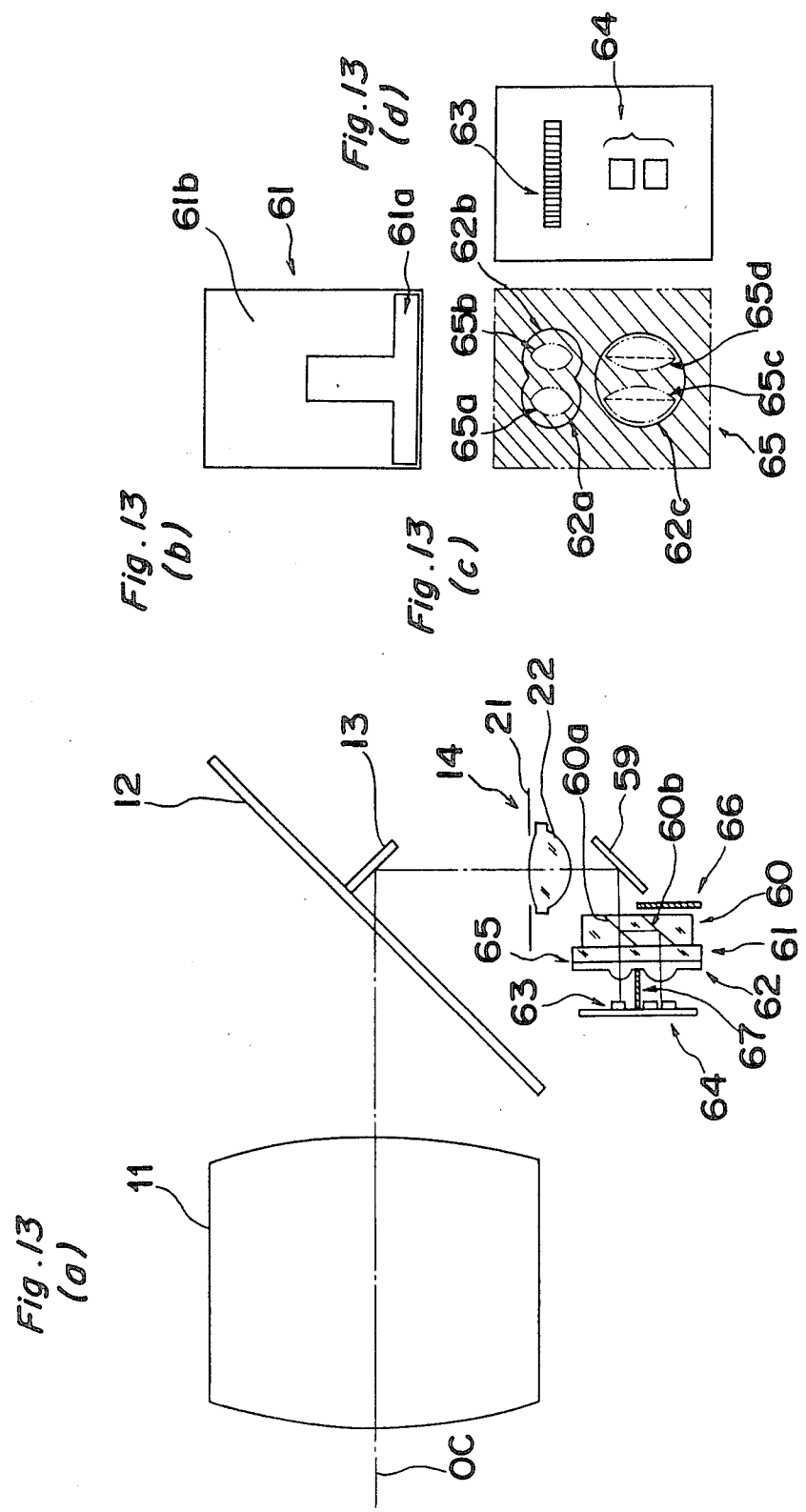
FIG. 13(a) is a schematical sectional view of another optical system for focus detection according to the present invention, FIGS. 13(b), (c) and (d) are a front view of an electrochromic device, an explanative front view of an iris plate shown in FIG. 13(a) and a front view of a light receiving device, respectively.

FIGS. 13(a), (b), (c) and (d) show another preferred embodiment of the optical system for focus detection according to the present invention.

As shown in FIG. 13(a), the light bundle having passed through the objective lens 11 and the predetermined portion of the reflex mirror 12 is reflected by the mirror 13 toward the focus detection device 14. Said light reflected by the mirror 13 is again reflected by a mirror 59 after passing through the aperture of the mask 21 and the condenser lens 22. The light beams reflected by the mirror 59 is split by a beam splitter 60 into two in which there are provided an optical filter plane 60a and a reflection mirror plane 60b. The optical filter plane 60a allows the visible light to pass but reflects the infrared light. At the rear side of the beam splitter 60, an electrochromic device 61 and a secondary focusing lens means 62 are arranged. Between said electrochromic device 61 and secondary focusing lens means 62, there is provided an iris plate 65 having two pairs of iris apertures 65a, 65b and 65c, 65d as shown in FIG. 13(c).

The secondary focusing lens means 62 has a pair of secondary focusing lenses 62a and 62b which are formed so as to refocus each of the light bundles passing through the first pair of iris apertures 65a and 65b on light receiving linear arrays 63 arranged therebehind. On the contrary to the above, behind the second pair of iris apertures 65c and 65d, there is arranged a single focusing lens 62c which covers both of the iris apertures 65c and 65d. On the focal plane of said single focusing lens 62c, there are provided two light receiving devices 64 which are arranged in a direction perpendicular to the lengthwise direction of the light receiving arrays 63. Said optical system including iris apertures 65c and 65d, the single focusing lens 62c and two light receiving devices 64 are provided for the active AF and said iris apertures 65c and 65d are provided for detecting possible flares and/or ghosts due to reflections between or among surfaces of lenses constructing the objective lens system.

The electrochromic device 61 has a segment electrode 61a of "inverted T" shape and another segment electrode 61b which covers area other than the former. These two segment electrodes 61a and 61b are provided for switching areas of each of the iris apertures 65c and 65d in a manner similar to the manner as mentioned with respect to FIG. 9.

Figure 14:
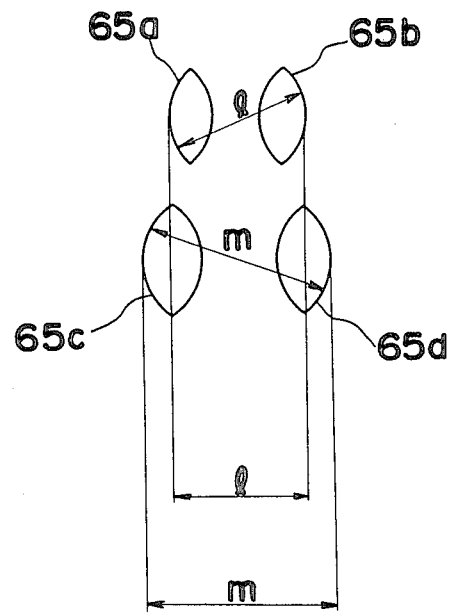
FIG. 14 is an explanative view showing a dimensional relation between first and second pairs of iris apertures shown in FIG. 13(a), FIGS. 15(a) and (b) are explanative views showing the relation between a second pair of iris apertures and the first transparent electrode, respectively.

As shown in FIG. 14, the dimension l defined by first pair of iris apertures 65a and 65b for the passive AF is set smaller than the dimension m defined by the second pair of iris apertures 65c and 65d for the active AF. Accordingly, light rays passing through a portion of the objective lens being brighter than that at the passive AF are introduced into the light receiving devices 64 at the active AF.

This is intended to elongate the distance to the object being capable of detecting the focusing condition at the active AF by increasing the amount of the light beams incident into the light receiving devices. However, as a result of that, a part of the incident light beams into iris apertures 65c and 65d is cut off by the aperture (iris) of the objective lens when an objective lens of a large F-number is used.

As stated above, correlation between two images is calculated to detect focusing condition in the passive AF. Contrary to the above, in the active AF, since the position of the image refocused by the secondary focusing lens 62 is detected by the difference between amounts of light beams incident into two light receiving devices 64, the focus detection by the active AF is not affected by the cut off of the incident light beams due to the iris aperture of the ojective lens.

Figure 15:
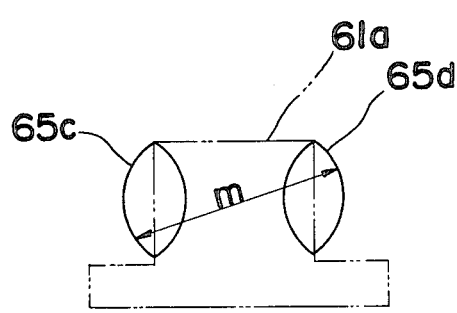
Figure 15:
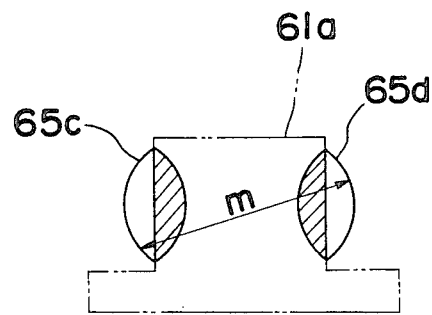

As shown in FIGS. 15(a) and (b), the stem portion of the first segment electrode 61a divides each of the second iris apertures 65c and 65d into two areas.

In the case of such an objective lens system that flares and/or ghosts are formed in a small area, namely an objective lens of 50/1.7 or 35-105/3.5-4.5 (L) in the examples shown in FIG. 6, the iris apertures 65c and 65d are opened fully as shown in FIG. 15(a).

Contrary to the above, with an objective lens system such that flares and/or ghosts are formed spread over a relatively large area, namely, an objective lens of 35-105/3.5-4.5 (S), as indicated by hatched area in FIG. 15(b), each inner half area of the second iris apertures 65c and 65d is closed by applying a proper voltage to the first segment electrode 61a. Therefore, light beams passing through the center area of the objective lens are cut off and only light beams passing through the peripheral area thereof are permitted to pass through the second iris apertures 65c and 65d. Accordingly, flares and ghosts are cut off against the secondary focusing lens 62 and the light receiving devices 64.

The reason why the light receiving devices 64 are arranged in the longitudinal direciton is that the image of an object to be focused on the light receiving means is moved in the longitudinal direction according to the focus control. According to this principle, it becomes possible to detect the focusing condition by comparing outputs of said two light receiving devices 64 (See JP-A No. 155832/1979). In FIG. 13(a), numeral references 66 and 67 are shelter plates for sheltering unnecessary light rays.

Figure 16:
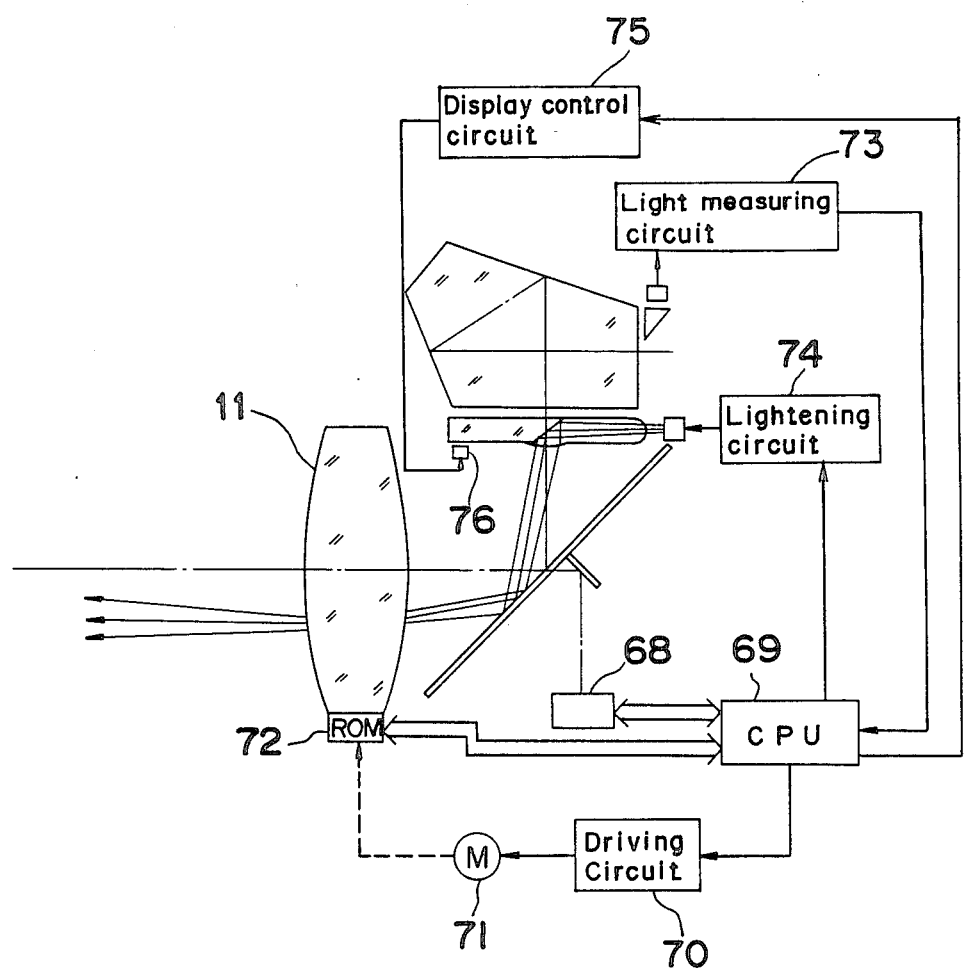
FIG. 16 is a block diagram showing a focus detection circuit according to the present invention.

FIG. 16 shows a block diagram of a circuit for focus detection. A focus detection circuit 68 sends signals to a microcomputer 69 installed in the camera. The microcomputer 69 calculates the focusing condition according to output signals from the focus detection circuit 68 and, according to the result calculated, sends control signals to a lens driving circuit 70 for driving a lens motor 71. The lens motor 71 shifts the objective lens 11 via the shifting mechanism (not shown in FIG. 16). As schematically shown in FIG. 16, the objective lens provides a ROM (Read Only Memory) means 72 therein in which a variety of information of the individual objective lens such as minimum F-number, type of lens composition (refractive type, reflective type), focal length, amount of spherical aberration and so on, are memorized therein. The camera has also a light measuring circuit 73 for measuring the brightness of an object. The light measuring circuit 73 outputs a command signal to a lightening circuit 74 for energizing an LED when the object is too dark to detect the focusing condition by the passive AF. When said command signal is input into the microcomputer 69, the latter 69 controls the electrochromic device to switch iris areas referring to information stored in the ROM 72. The camera also provides a display control circuit 75 for turning on or off a display device 76 to indicate the focusing condition and to give a warning to the user which indicates that it is impossible to carry out the active AF with the objective len system presently mounted. The objective lens system mentioned just above is a lens assembly such that it is impossible due to flares and/or ghosts to carry out the active AF even though the present invention is applied thereto.

Figure 17:
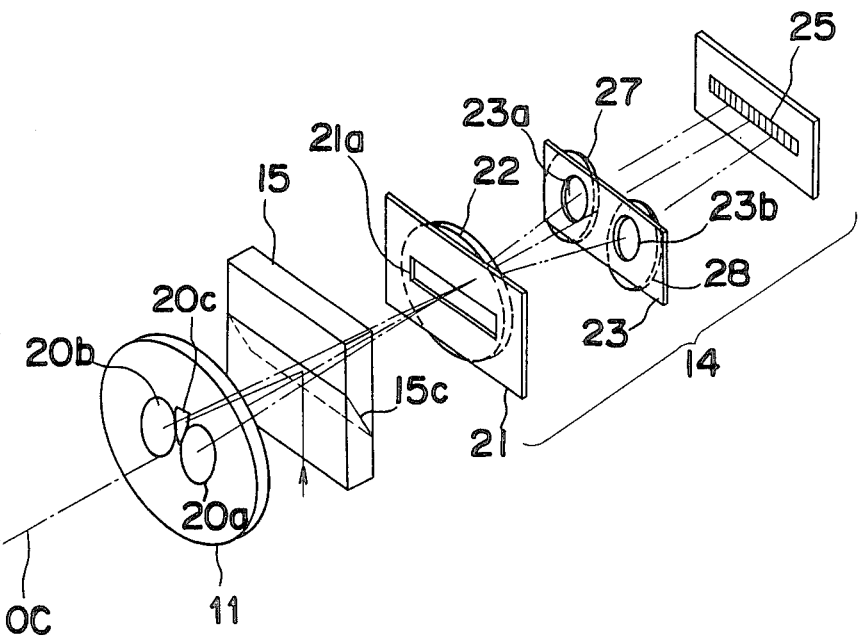
FIG. 17 is a perspective view of a focus detection system according to a second embodiment of the present invention, FIGS. 18(a) and (b) are perspective views showing a single light ray model and a light bundle model, respectively, for showing how harmful light images are generated by surface reflections.

FIG. 17 shows another preferred embodiment of the optical system for focus detection including a light projection system.

As shown in FIG. 17, there are arranged, along the optical axis OC of an objective lens 11, an optical member 15 for projecting light beams to an object through the objective lens, a first mask 21 having a slit-like aperture 21a which is positioned in the focal plane or in a plane near the focal plane, a condenser lens 22 being positioned just behind the first mask 21, an iris plate 23 having a pair of left and right iris apertures 23a and 23b of single oval shapes, a pair of secondary focusing lenses 27 and 28 being attached just behind the iris apertures 23a and 23b respectively and a light receiving device 25 being comprised of linear arrays of CCD cells.

Figure 18:
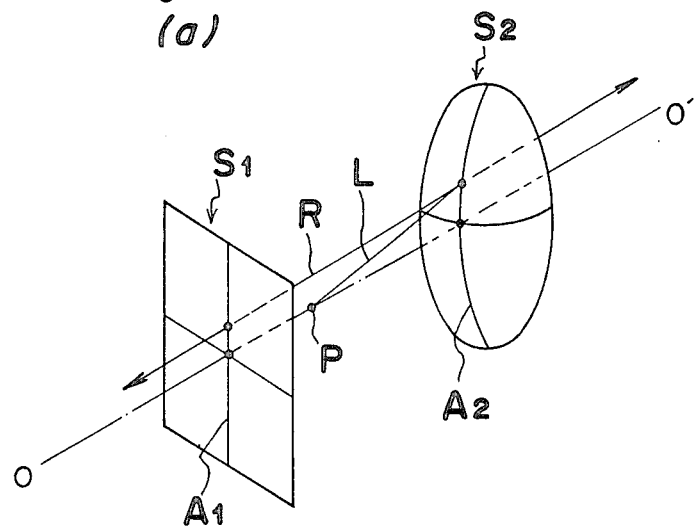
Figure 18:
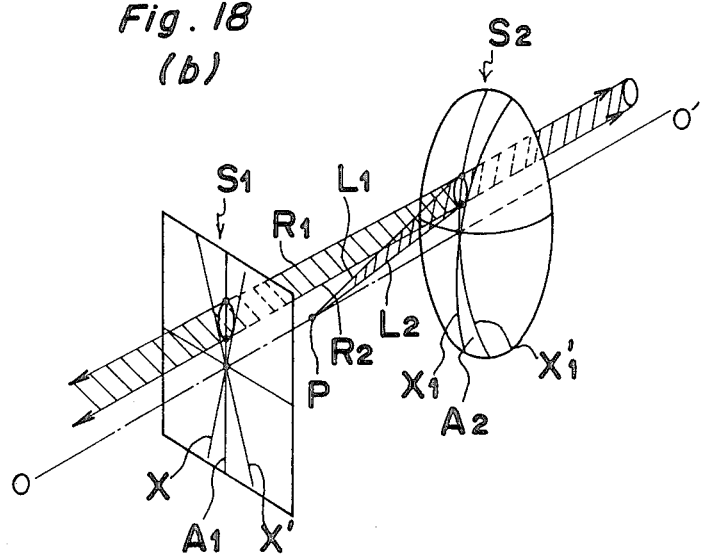

Let us consider a projection system effective to avoid bad influences due to flares and/or ghosts referring to FIGS. 18(a) and (b) and FIG. 19.

FIGS. 18(a) and (b) show models for showing a harmful light ray and light bundle generated by reflections due to surfaces of lenses constructing an objective lens.

FIG. 18(a) shows a single light ray model for brevity and FIG. 18(b) shows a light bundle model.

In FIG. 18(a), a light ray L emitted from a point P on the optical axis O-O' of an objective lens is reflected by the spherical surface $S_2$ representing the surface of the objective lens. The reflected light R is included in a plane defined by the optical axis O-O' and the light ray L, although the direction of the reflected light R is varied depending on the curvature of said surface $S_2$.

Similarly, as shown in FIG. 18(b), a light bundle $R_1$ and $R_2$ having been reflected by the surface $S_2$ of the objective lens is included in an area essentially defined by the optical axis O-O' and two lines $X_1$, $X_1'$ r X, X'.

According to this optical construction, it becomes possible to increase the light amount of the projection light without a possible increase of accompanying area of the harmful light if the projection light bundle is so restricted as to have a section of a fan shape as shown in FIG. 19. This serves to elongate the focus-detectable distance.

This is achieved by an electrochromic device 16 arranged just before a projection lens 17. Namely, light beams emitted from a LED are collected on a point of the optical axis O-O' by the projection lens 17 and the electrochromic device 16 restricts the emitted light beams into a light bundle having a section of a fan shape. This light bundle is focused on the predetermined focal plane F or a plane near said focal plane F and is projected to an object through the objective lens 11.

Figure 20:
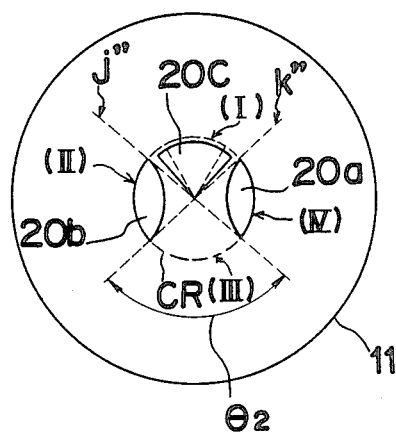
FIG. 20 is an explanative front view of an objective lens for showing the relation between the projection light bundle and a pair of iris apertures.

FIG. 20 shows a relation between the projection light bundle and light beams to be detected by the focus detection system on the pupil plane of the objective lens 11.

Suppose two areas 20a and 20b on the pupil plane of the objective lens 11 each of which corresponds to one of the iris apertures 23a and 23b of the iris plate 23 and a circle CR including these two areas 20a and 20b.

When said circle CR is divided into first to fourth sections (I)-(IV) by a line j connecting the uppermost point of the area 20b and the lowest point of the area 20a and a line k connecting the uppermost point of the area 20a and the lowest point of the area 20b, the area 20a for projecting light rays is so selected as to belong to either the first (I) or third section (III).

According to this structure, it becomes possible to use an interchangeable lens having a large minimum F-number even at the active AF as well as at the passive AF.

Figure 21A:
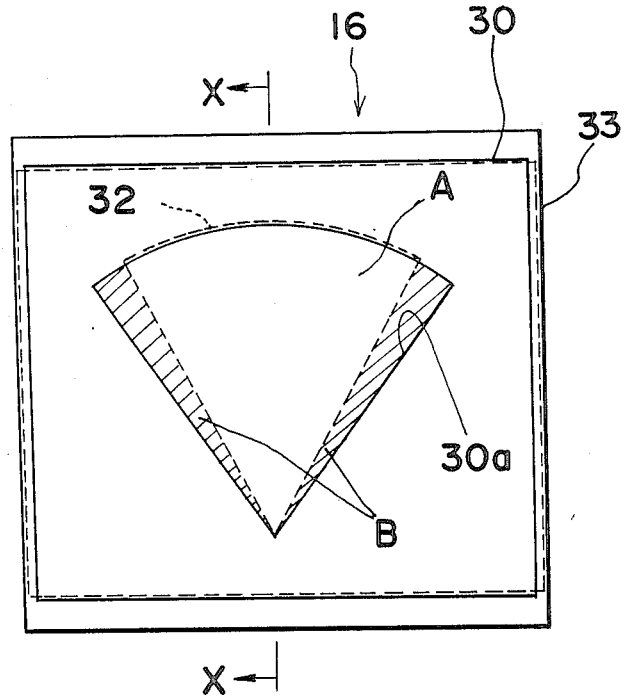
FIG. 21(a) is an explanative front view of an electrochromic device suitable for the light projection system shown in FIG. 17.

FIGS. 21(a) and (b) show a desirable electrochromic device 16 for the projection system.

As shown in FIGS. 21(a) and (b), the device 16 has an iris plate 30 having an iris aperture 30a of fan shape which is attached on the front surface thereof and a first transparent glass plate 31.

On the inner surface of said first transparent glass plate 31, a first transparent electrode 32 of fan shape and a second transparent electrode 33 surrounding the first transparent electrode 32 are formed insulated from each other.

As shown clearly in FIG. 21(a), said first electrode 32 is so formed as to have a center angle narrower than that of the iris aperture 30a.

Figure 21B:
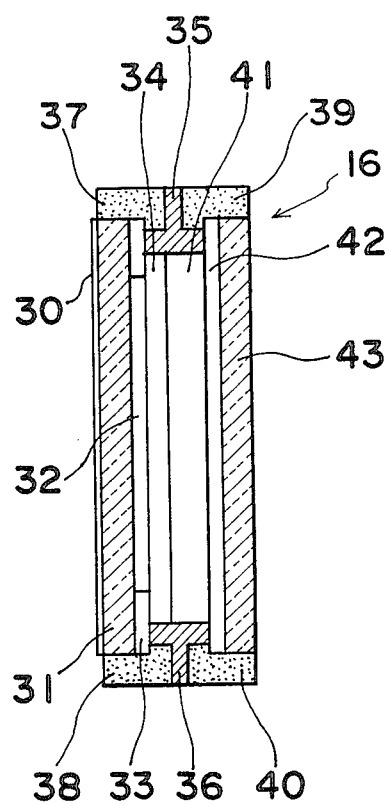
FIG. 21(b) is a sectional view along line X—X of FIG. 21(a).

Other structures shown in FIG. 21(b) are substantially the same as those of the device shown in FIGS. 9(a) and (b). Therefore, further explanations about these structures will be abbreviated by designating like parts by like reference numerals in FIG. 21(b) to those in FIG. 9(b).

According to the structures mentioned above, it becomes possible to switch the iris aperture from A to (A+B) or vice versa. Namely, when a proper voltage is applied to the second electrode 33, the area B of the iris aperture is colored to block light beams incident thereupon.

When such an interchangeable lens as of 50/1.7 or 35-105/3.5-4.5 (L) is used, the full area (AB) of the iris aperture is used. And, in the case when an interchangeable lens as of 35-105/3.5-4.5 (S) is used, the area is switched from the full area (A+B) to the narrower area A in order to remove bad influences due to flares and/or ghosts.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A camera with an objective lens means comprising:
   a refocusing means for forming two images by refocusing an image in a focal plane of the objective lens which is arranged behind said focal plane;
   a light bundle restricting means for splitting a light bundle passing through the objective lens into two, said restricting means being arranged near the refocusing means and providing a pair of apertures arranged at positions substantially symmetric with respect to the optical axis of the objective lens;
   a light receiving means for receiving two images formed by said refocusing means,
   a focus detecting means for detecting whether an objective image is focused on the focal plane according to outputs of said light receiving means; and
   a light projecting means for projecting light beams against an object at an angle inclined to the optical axis in a plane defined by said optical axis and a line substantially perpendicular to a center line connecting centers of said two apertures of the light bundle restricting means.

2. A camera according to claim 1, comprising further an aperture control means for switching dimensions and/or positions of said pair of apertures of the light bundle restricting means according to a state of light reflected by the surface of the objective lens means.

3. A camera according to claim 2, in which said light bundle restricting means is constituted by at least one electrochromic device.

4. A camera according to claim 2, in which said aperture control means comprises:
   a detection means for detecting whether there is being used an objective lens which causes a light reflected by the surface of the objective lens means against said light receiving means;
   a position switching means for selectively switching positions of said pair of apertures between first positions remote from said optical axis and second positions near thereto; and
   a switching control means for controlling said position switching means in such a manner that said positions of said pair of apertures of said light bundle restricting means are switched to said first positions respectively when an objective lens is used which causes said light reflected by the surface of the objective lens means and to said second position when an objective lens is used which causes no reflected light.

5. A camera according to claim 2, in which said aperture control means comprises:
   a detection means for detecting whether there is being used an objective lens which causes light reflected by the objective lens means;
   a dimension switching means for switching sizes of said pair of apertures of the light bundle restricting means;
   and
   a switching control means for controlling said dimension switching means so as to maximize dimensions of said pair of apertures when an objective lens which causes no reflected light is being used.

6. A camera with an objective lens means comprising:
   a refocusing means for forming two images by refocusing an image in a focal plane of the objective lens which is arranged behind said focal plane;
   a light bundle restricting means for splitting a light bundle passing through the objective lens into two which is arranged near the refocusing means and provides a pair of apertures arranged at positions substantially symmetric with respect to the optical axis of the objective lens;
   a light receiving means for receiving two images formed by said refocusing means;
   a focus detecting means for detecting whether an objective image is focused on the focal plane according to outputs of said light receiving means;
   a light projecting means for projecting light beams against an object at an angle inclined to the optical axis in a plane defined by said optical axis and a line substantially perpendicular to a center line connecting centers of said two apertures of the light bundle restricting means; and
   a control means for switching the positions of said pair of apertures of the light bundle restricting means according to whether the light projecting means is used.

7. A camera with an objective lens means comprising:
   a refocusing means for forming two images by refocusing an image in a focal plane of the objective lens which is arranged behind said focal plane;
   a light bundle restricting means for splitting a light bundle passing through the objective lens into two which is arranged near the refocusing means and provides a pair of apertures arranged at positions substantially symmetric with respect to the optical axis of the objective lens;
   a light receiving means for receiving two images formed by said refocusing means;
   a focus detecting means for detecting whether an objective image is focused on the focal plane according to outputs of said light receiving means;
   a light projecting means for projecting light beams against an object at an angle inclined to the optical axis in a plane defined by said optical axis and a line substantially perpendicular to a center line connecting centers of said two apertures of the light bundle restricting means;

a control means for switching the positions of said pair of apertures of the light bundle restricting means according to whether the light projecting means is used; wherein said switching control means comprises:

a detection means for detecting whether said light projecting means is energized;

a position switching means for selectively switching positions of said pair of apertures between first positions remote from said optical axis and second positions near thereto; and a switching control means for controlling said position switching means so as to switch said positions of said pair of apertures to said first positions when the light projecting means is energized.

8. A camera according to claim 1, in which said light projecting means comprises a light emitting device and a collecting means for collecting light rays emitted from said light emitting device to a point on the optical axis of the objective lens means.

9. A camera according to claim 8, in which said light collecting means collects rays emitted from said light emitting device at a point of said optical axis near to said focal plane or a plane conjugate with said focal plane.

10. A camera according to claim 8, in which said light projecting means further includes at least two light bundle restricting means having an aperture of fan shaped which are arranged near to said light emitting device and a predetermined focal plane or a plane conjugate therewith.

11. A camera according to claim 10, in which said light projecting means further comprises:

a detection means for detecting whether an objective lens is being used which causes light reflected by the surface of the objective lens means; and a size switching means for switching the size of said aperture according to the output from said detection means, said aperture being fan-shaped.

12. A camera according to claim 11, in which said light bundle restricting means is constituted by an electrochromic device.

13. A camera with an objective lens means comprising:

a refocusing means for forming two images by refocusing an image in a focal plane of the objective lens which is arranged behind said focal plane;

a light bundle restricting means for splitting a light bundle passing through the objective lens into two which is arranged near the refocusing means and provides a pair of apertures arranged at positions substantially symmetric with respect to the optical axis of the objective lens;

a light receiving means for receiving two images formed by said refocusing means;

a focus detecting means for detecting whether an objective image is focused on the focal plane according to outputs of said light receiving means;

a light projecting means for projecting light beams against an object at an angle inclined to the optical axis in a plane defined by said optical axis and a line substantially perpendicular to a center line connecting centers of said two apertures of the light bundle restricting means;

a second light bundle restricting means for splitting a light bundle passing through the objective lens into two which is arranged near the refocusing means and has a pair of apertures arranged symmetrically with respect to the optical axis of the objective lens;

a second light receiving means having a pair of light receiving devices being adjacent to each other for receiving light bundles passing through said second light receiving means; and a second focus detecting means for detecting whether an objective image is focused on the focal plane of the objective lens by comparing outputs from said pair of light receiving devices with each other.

14. A camera with an objective lens means comprising;

a refocusing means for forming two images by refocusing an image in a focal plane of the objective lens means which is arranged behind said focal plane;

a light bundle restricting means for splitting a light bundle passing through the objective lens into two which is arranged near said refocusing means and provides a pair of apertures arranged symmetrically with respect to the optical axis of the objective lens;

a light receiving means having a pair of light receiving devices arranged adjacent to each other for receiving two images refocused by said refocusing means;

a focus detection means for detecting whether an objective image is focused on the focal plane of the objective lens by comparing outputs of said pair of light receiving devices; and a light projecting means for projecting light against an object at an angle inclined to the optical axis in a plane defined by said optical axis and a line substantially perpendicular to a center line connecting centers of said two apertures of the light bundle restricting means.

15. A camera according to claim 14, in which said refocusing means comprises two optical focusing means for focusing a pair of images to be refocused and said pair of apertures is formed for each of said optical focusing means.

16. A camera according to claim 15, in which said pair of light receiving devices is aligned in a direction orthogonal to the direction of arrangement of said apertures of the light bundle restricting means.

* * * * *